United States Patent [19]
Kou

[11] Patent Number: 5,434,847
[45] Date of Patent: Jul. 18, 1995

[54] RANDOM ACCESS SATELLITE COMMUNICATION SYSTEM USING RANDOM NUMBERS GENERATED IN A RANGE VARIABLE WITH CHANNEL TRAFFIC

[75] Inventor: Yukari Kou, Tokyo, Japan

[73] Assignee: NEC Corporation, Tokyo, Japan

[21] Appl. No.: 202,353

[22] Filed: Feb. 25, 1994

[30] Foreign Application Priority Data

Feb. 26, 1993 [JP] Japan ................................. 5-038647

[51] Int. Cl.$^6$ .......................... H04B 7/212; H04J 3/26
[52] U.S. Cl. ...................................... 370/17; 370/85.3; 370/94.1; 370/95.3
[58] Field of Search ................. 370/17, 79, 85.2, 85.3, 370/85.6, 85.7, 94.1, 94.2, 95.1, 95.3, 97, 104.1, 110.1

[56] References Cited

U.S. PATENT DOCUMENTS 4,506,361  3/1985  Kume ............... 370/94.1 X

Primary Examiner—Melvin Marcelo
Attorney, Agent, or Firm—Ostrolenk, Faber, Gerb & Soffen

[57] ABSTRACT

In a satellite communications system comprising a central station and remote stations, each remote station sends a packet containing user data on a randomly determined slot of a forward satellite channel. If the packet is received by the central station, it sends traffic data and an acknowledgment signal. If the absence of acknowledgment signal is detected by the remote station, it generates a random number in a range determined by the traffic data and increments a count value indicating a number of instances where the acknowledgment signal is not returned. The packet containing the count value is retransmitted on a time slot determined by the random number. If an acknowledgment signal is received, the count value is reset to zero. The central station, on receiving a packet, generates an acknowledgment signal, and derives a sum of the total of packets received during a predetermined interval and the total of count values contained in such packets. The traffic data is derived from the sum and transmitted with the acknowledgment signal and host data on a backward satellite channel.

6 Claims, 4 Drawing Sheets

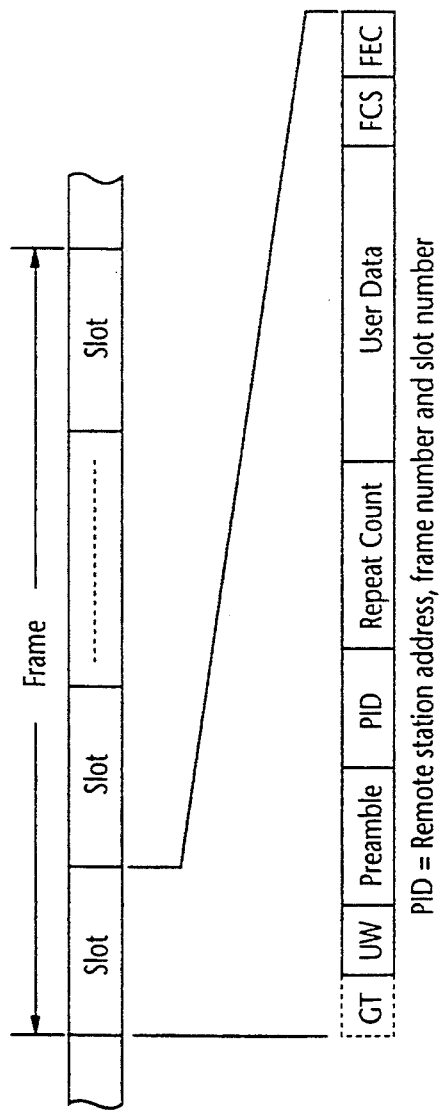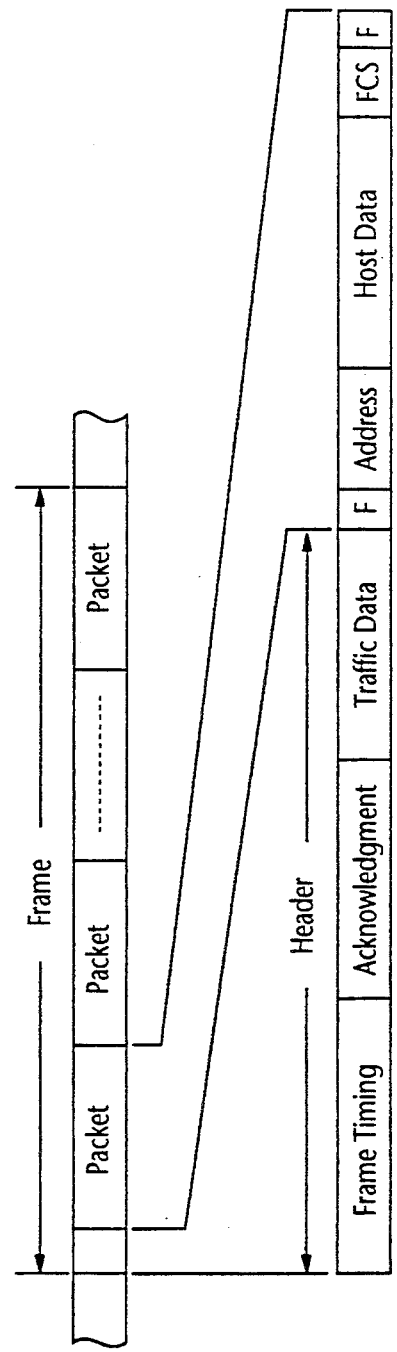

Remote Station

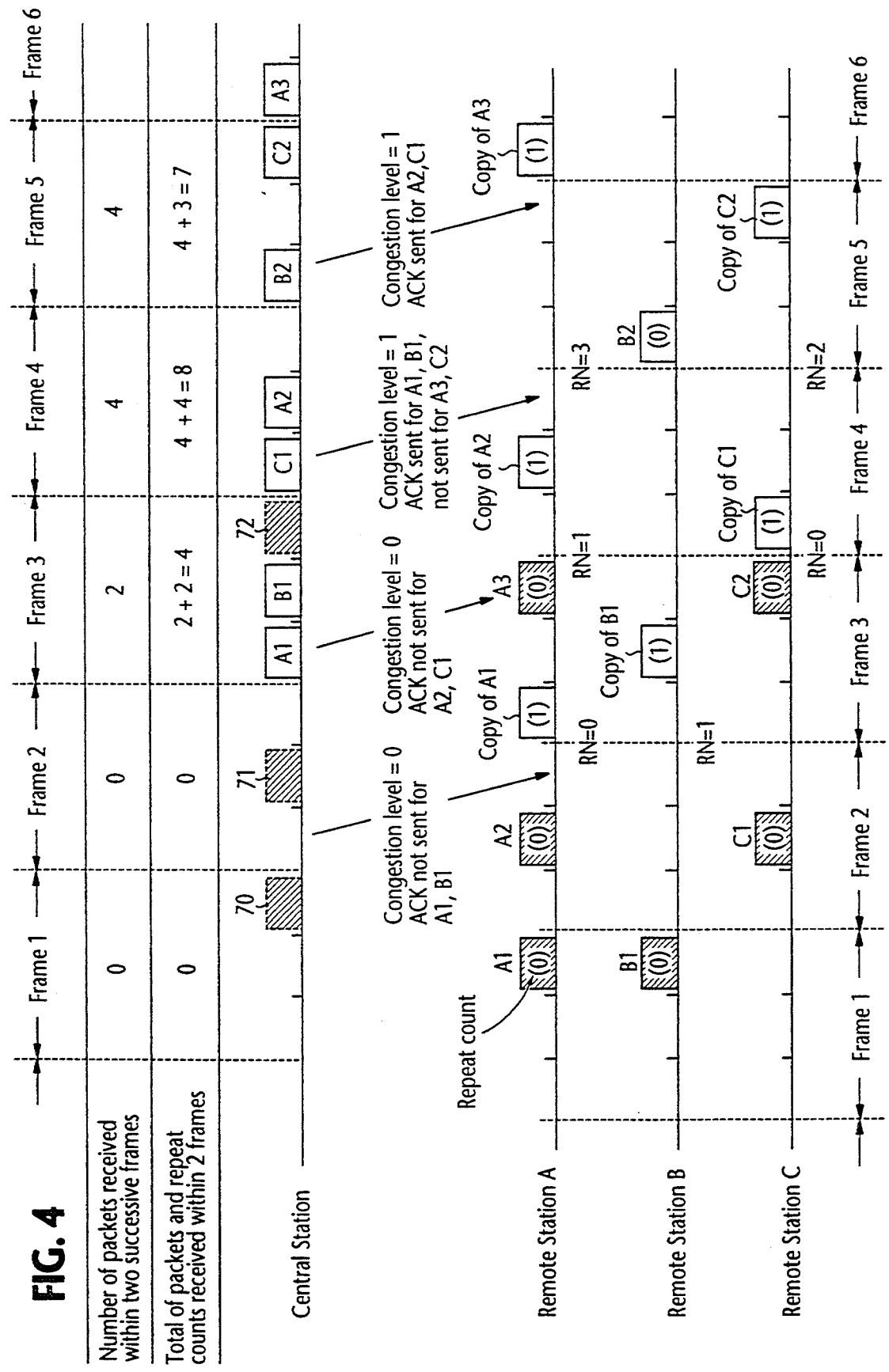

RANDOM ACCESS SATELLITE COMMUNICATION SYSTEM USING RANDOM NUMBERS GENERATED IN A RANGE VARIABLE WITH CHANNEL TRAFFIC

BACKGROUND OF THE INVENTION

1. Field of the Invention

The present invention relates generally to multiple random access satellite communications system in which satellite channels are established between a central station and a plurality of remote stations, and more specifically to a technique for reducing the probability of collisions between simultaneously transmitted packets.

2. Description of the Related Art

The known slotted ALOHA system is a time division multiple access satellite communication system for establishing communications between a central station and a plurality of remote stations. In the slotted ALOHA system where the communication channel is divided into time slots, the remote stations send their packets on a randomly accessed time slot. The beneficial feature of this type of access is the ability to reduce transmission delay when the rate of transmissions is small. However, when the rate of transmissions is high, the rate of collisions increases, resulting in low channel utilization efficiency and long transmission delay. To avoid poor system utilization efficiency as a result of high transmission rate, it is necessary to decrease retransmissions and to avoid collisions between retransmitted packets. A method that is generally employed for retransmission is to use a random number to specify a period of time the conflicting station must wait before an attempt is made to gain access to the channel. If the number of random numbers that can be generated is small, there is a high likelihood of coincidence between two or more remote stations using the same random number. Further, if the rate of retransmissions and hence the rate of collisions is high, it is more effective for the remote stations using a greater range of random numbers to reduce traffic congestion than for those remote stations using a smaller range of random numbers. However, at low retransmission rates conflicting stations may wait an unnecessarily long period of time before they are allowed to retransmit a packet.

SUMMARY OF THE INVENTION

It is therefore an object of the present invention to provide a slotted random access satellite communications system wherein the provability of successful transmissions from the remote stations of the system to a common satellite channel is increased by using traffic data of the channel collected by the central station.

In the satellite communications system of the present invention, a forward satellite channel is established from each of remote stations to a central station and a backward satellite channel is established from the central station to each of the remote stations. The backward satellite channel is divided into a plurality of frames and the forward satellite channel is divided into frames corresponding to the frames of the backward channel. Each of the frames of the forward channel is subdivided into slots. From each remote station, a packet containing user data is randomly transmitted on one of the slots of the forward satellite channel. If the packet is received by the central station, it sends traffic data and an acknowledgment signal. Otherwise, no acknowledgment signal is transmitted. If no acknowledgment signal is received, the remote station generates a random number in a range determined by the traffic data, and increments a count value indicating a number of instances where no acknowledgment signal is received, and the packet containing the count value is retransmitted on a slot of the forward channel determined by the random number. If an acknowledgment signal is received, the count value is reset to zero. On receiving a packet, the central station generates an acknowledgment signal for the received packet, derives a sum of a total of packets received during a predetermined interval and a total of count values contained in such packets, and derives the traffic data from the sum. The acknowledgment signal, the traffic data and host data are transmitted on one of the frames of the backward channel.

Since the range of random numbers that can be generated is controlled in response to the traffic data, random numbers generated at high traffic loads are distributed over a wide range and collisions are less likely to occur, while random numbers generated at low traffic loads are distributed in a small range and remote stations do not experience unnecessary long wait.

BRIEF DESCRIPTION OF THE DRAWINGS

The present invention will be described in further detail with reference to the accompanying drawings, in which:

FIG. 2A is a burst data structure used by each remote station of the system, and FIG. 2B is a frame sequence transmitted from the central station;

FIG. 4 is a time sequence for describing the operation of the system.

DETAILED DESCRIPTION

Figure 1:
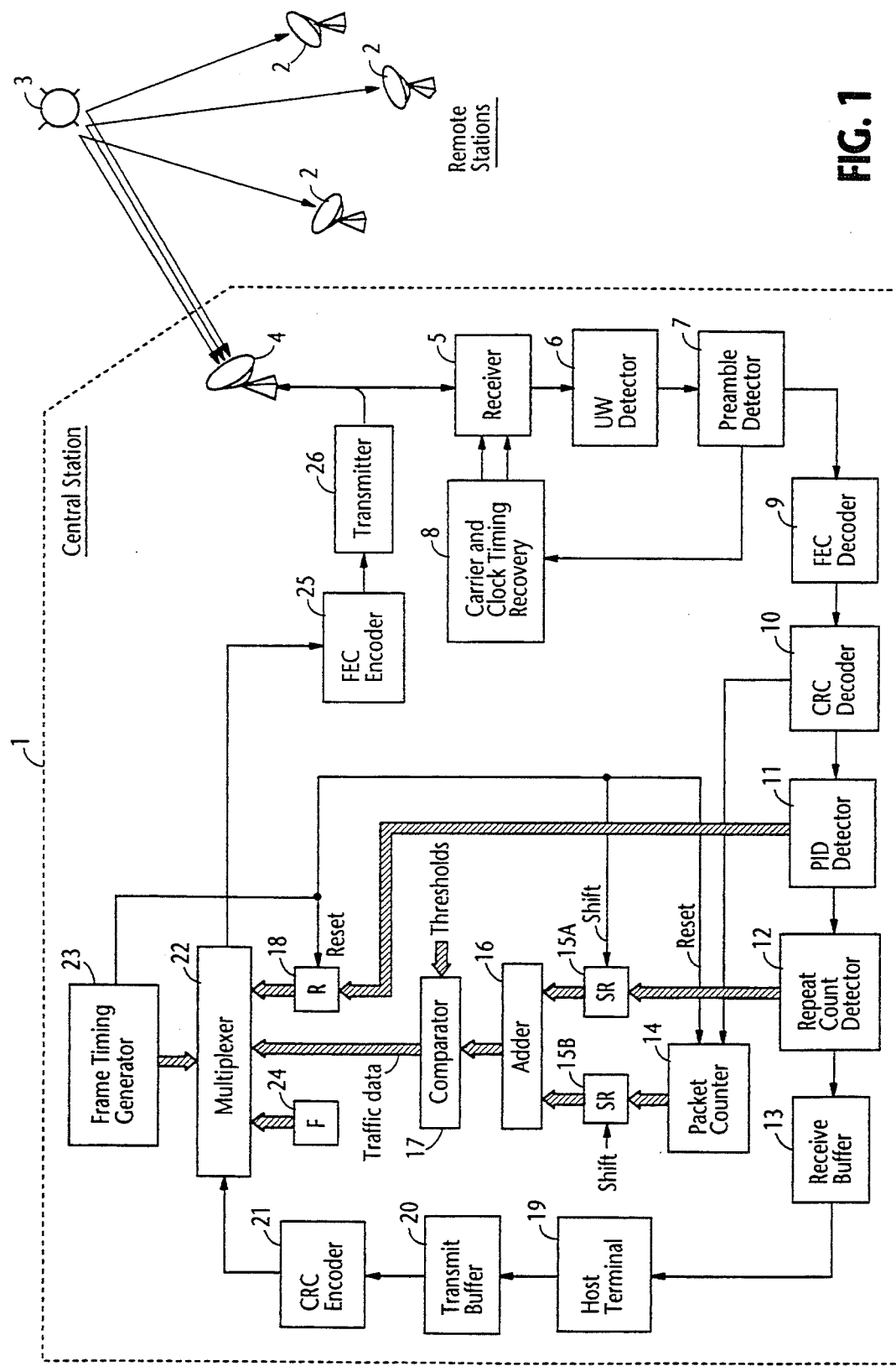
FIG. 1 is a block diagram of a satellite communications system showing details of a central station.

As illustrated in FIG. 1, the satellite communications system of the present invention comprises a central station 1, a plurality of remote stations 2 and a communications satellite 3. Each remote station randomly gains access to a slotted satellite channel when transmitting a user data packet to the central station and receives host data from the central station.

As shown in FIG. 2A, the forward channel from each remote station 2 to the central station is divided into frames and each frame is subdivided into slots. Each remote station sends a packet in the form of a burst on one of the slots following a guard time (GT). The packet contains a unique word (UW) having a unique code pattern indicating the beginning of the burst followed by a preamble that contains a bit sequence that allows the central station to quickly recover carrier and clock timing for synchronization. A packet identifier (PID) field is provided to indicate the address of a source remote station, and a frame number and a slot number for identifying the frame and one of its slots on which a packet is sent from the source remote station. According to the present invention, a repeat count field is provided following the address field to indicate the number of repeated attempts to gain access to the channel. A user data field follows to send information bits whose length may vary. Dummy bits are used to fill the user data field if the length of the information bits is smaller than the length of the user data field. The user data field is followed by an FCS (frame check sequence) field and an FEC (forward error correction) field for inserting redundant bits to be used by the central station for performing error detection and correction.

As shown in FIG. 2B, the backward channel from central station 1 to remote stations 2 is likewise divided into frames each containing a header followed by a sequence of data packets. The header comprises a frame timing field, an acknowledgment field and a traffic data field. The frame timing field contains a frame timing signal which identifies the frame and is used by each remote station as a reference time for determining a slot on which it sends a packet. The acknowledgment (ACK) field contains as many acknowledgment signals as there are remote stations from which the central station has successfully received their packets. Each acknowledgment signal includes the address of the source remote station, the frame number and the slot number received from a remote station. According to the present invention, the traffic data indicates the congestion level of the satellite channel. This traffic data is derived from the total of initial packets and retransmitted packets received within a specified number of frames in a manner as will be described. Each data packet of the frame sequence comprises an opening flag (F), an address field containing the address of a destination remote station, host data, the redundant bits of a frame check sequence and a closing flag (F).

Returning to FIG. 1, at central station 1, signals from remote stations 2 are received by antenna 4 where the down-link frequency is translated into an intermediate frequency and applied to a receiver 5. For translation to the baseband frequency, the IF signal is demodulated with a local carrier supplied from a carrier and clock timing recovery (CCR) circuit 8 and binary decision is performed on the demodulated signal for conversion to a digital signal by using the clock from the CCR circuit 8. The output of receiver 5 is fed into a unique word detector 6 where the beginning of the received packet is detected and the portion of the received packet following the unique word is supplied to a preamble detector 7. Preamble detector 7 extracts the bit sequence contained in the preamble of the packet and supplies to the CCR circuit 8 to allow it to recover the carrier and clock timing pulse.

A forward error correction (FEC) decoder 9 is connected to preamble detector 7 to receive the portion of the packet that follows the preamble and performs error correction on the packet using the redundant bits inserted to the FEC field of the packet. A cyclic redundant check (CRC) decoder 10 is connected to the output of FEC decoder 9 to provide error detection on the error-corrected signal using the redundant bits contained in the FCS field of the packet. If there is substantially no error in the user data, CRC decoder 10 signals this fact to a packet counter 14 indicating that a packet has been successfully received from a remote station, while applying the error-checked signal to an address detector 11. The address of the source remote station is extracted from the address field of the error-checked packet and stored in a register 18 as an acknowledgment signal for signalling receipt of the packet, the remainder of the packet being applied to a repeat count detector 12. The repeat count value contained in the repeat count field of the packet is detected by detector 12 and stored in a shift register 15A.

Packet counter 14 is reset in response to a frame timing signal from a frame timing generator 221 to clear its count stored in the previous frame and start counting the signal from the CRC decoder 10 for the current frame, indicating successful reception of a packet. Packet counter 14 produces a signal indicating the number of packets successfully received during a frame and supplies it to a shift register 15B where it is stored for a prescribed number of frames. Shift register 15A is shifted at frame intervals in response to the frame timing pulse and produces a total of packets retransmitted during that prescribed number of successive frames. Likewise, shift register 15B is shifted at frame intervals in response to the shift pulse supplied from the frame timing generator 221 and produces a total of initial packets received during that prescribed number of frames. The outputs of both shift registers are applied to an adder 16, where they are summed together to produce a total of initial packets and retransmitted packets which are counted during the successive frames. This total value is fed into a comparator 17 for making a comparison with threshold values representing reference congestion levels to determine the congestion level of the satellite channel. Traffic data indicating the determined congestion level is generated by comparator 17 and supplied to a multiplexer 22.

A receive buffer 121 is connected to the repeat count detector 12 to receive the user data contained in the data field of the packet and holds it therein until it is called upon by a host terminal 19.

A similar process will proceed for subsequently received packets, so that as many acknowledgment signals as there are successfully received packets will be stored in the register 18 during each frame.

A signal indicating the frame number is also generated by the frame timing generator 221 and supplied to the multiplexer 22 where it is multiplexed with the traffic data from comparator 17 and the acknowledgment signals from register 18.

Host data together with the address of a remote station to which it is destined is generated by the host terminal 19, and after being temporarily stored in a transmit buffer 20, is supplied to a CRC encoder 21 where a frame check sequence (FCS) is derived from the host data. The host data and the FCS are fed to the multiplexer 22. During each frame of the backward channel, the frame number, one or more acknowledgment signals and traffic data are combined together by multiplexer 22 to form a frame header. The frame header is multiplexed with a sequence of packets each containing an opening flag supplied from a flag generator 24, the destination address, the host data, the FCS and a closing flag from flag generator 24. An FEC encoder 25 is connected to the output of multiplexer 22 for performing an error correction encoding process on the frame signal to allow the destination remote station to perform error correction on the received signal. The output of FEC encoder 25 is coupled to a transmitter 26 where it is modulated on an intermediate-frequency carrier and fed to the antenna system 4. The IF signal is converted to an uplink frequency and transmitted as a sequence of frames to satellite 3 where it is converted to a downlink frequency and broadcast to the remote stations 2.

Figure 3:
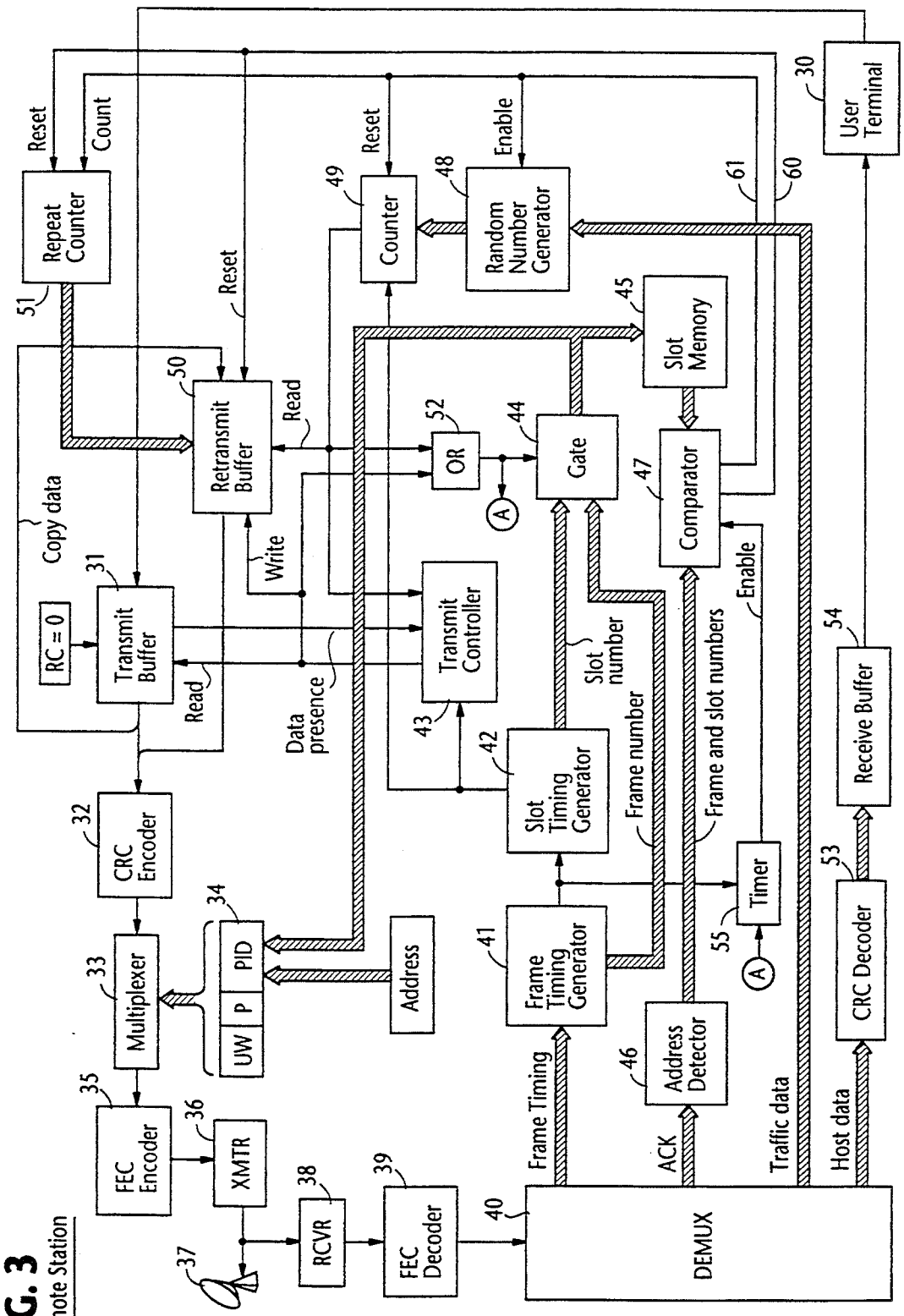
FIG. 3 is a block diagram of a remote station of the satellite communications system.

Referring to FIG. 3, each remote station 2 comprises a user terminal 30 which supplies user data to a transmit buffer 31 to form a packet according to the data format of the system. A repeat count value RC=0 is set into the repeat count field of the packet. When the transmit buffer 31 is supplied with user data, it applies a data presence indication to a transmit controller 44, which provides the timing control for the transmit buffer. The output of transmit buffer 31 is connected to a CRC encoder 32 where a frame check sequence is derived from the user data. The user data, repeat count and FCS are supplied a multiplexer 33 where they are multiplexed with a unique word, a preamble and a packet identifier supplied from a register 34. The output of multiplexer 33 is applied to an FEC encoder 35 where it is encoded with a forward error correction code using redundant bits. The redundant bits used in the FEC encoder are inserted to the FEC field of the packet. By a transmitter 36 the output signal of the FEC encoder 35 is modulated on an IF carrier and applied to an antenna system 37 where it is converted to an uplink frequency for transmission to satellite 3.

The signal from the satellite 3 is received by antenna system 37 where it is converted to an intermediate frequency. The receiver 38 then demodulates the IF signal and recovers the original signal at baseband frequency. The output of receiver 38 is coupled to an FEC decoder 39 for performing error correction on the baseband signal.

A demultiplexer 40 is connected to the output of FEC decoder 39 for detecting the frame timing signal, ACK signals, traffic data from the header of a frame and packet data from the respective packet fields of the frame. The frame timing signal is applied to a frame timing generator 41 for generating a frame timing pulse and a frame number for the reference timing of the remote station. A slot timing generator 42 is responsive to the frame timing pulse for generating a slot timing pulse and a slot number.

Transmit controller 43 is responsive to the slot timing pulse for applying a read command signal to the transmit buffer 31 if a data presence indication is given in the absence of an output from a retransmit counter 49 of programmable type which determines the read timing of a retransmit buffer 50 in a manner as will be described later. If there is no packet to retransmit at the transmit timing of buffer 31, the data stored therein is forwarded to the CRC encoder 32. If the presence of data in transmit buffer 31 concides with the transmit timing indicated by counter 49, the transmission of data in transmit buffer 31 is inhibited until the retransmit buffer 50 is emptied. In response to the read command signal from transmit controller 43, transmit buffer 31 supplies a copy of the transmitted user data to the retransmit buffer 50 for retransmission in the event of a possible collision. Retransmit buffer 50 stores the copy of the transmitted signal, using the read command from transmit controller 43 as a write command signal. A gate circuit 44 is provided, which responds to the read command signal from the transmit controller 43 via an OR gate 52 for storing the frame and slot numbers from timing generators 41 and 42 into a slot memory 45 and into the PID field of the register 34. In this way, the packet data from the transmit buffer 31 is identified by the frame and slot numbers stored in the register 34 and slot memory 45 for purposes of coincidence check. The output of OR gate 52 is further applied to a timer 55 that counts frame pulses from the frame timing generator 41 and determines the timing at which an acknowledgment signal is to likely to arrive at the remote station.

One or more ACK signals contained in the ACK field of the received signal are supplied from demultiplexer 40 to an address detector 46 where the address of each ACK signal is checked against the address of the remote station to detect coincidence. If an ACK signal bearing the address of the remote station is detected, the address detector 46 supplies the frame and slot numbers contained in the detected ACK signal to a comparator 47. Comparator 47 is enabled in response to the output of the timer 55 for making a comparison between the received frame and slot numbers and those stored in a location of the slot memory 45 corresponding to the transmitted packet. If they match, comparator 47 recognizes that the transmitted packet has been correctly received by the central station, and it produces an output signal on lead 60 to reset a repeat counter 51 to zero and reset the retransmit buffer 50 to discard the copy of the transmitted user data. The host data destined to the remote station is detected by multiplexer 40 and supplied to a CRC decoder 53 for error detection. Following the error detection process, the host data is temporarily stored into a receive buffer 54 before being supplied to the user terminal 30.

If the transmitted packet has been disrupted by collision, no ACK signal will be received and comparator 47 applies an output to lead 61 to enable a variable-range random number generator 48 and reset the retransmit counter 49. Random number generator 48 produces one of random numbers that can be generated in the range specified by the received traffic data. The generated random number is applied as a preset count value to the counter 49 to cause it to start counting slot timing pulses from the slot timing generator 42. When the preset count value is reached, retransmit counter 49 produces an output signal, which is applied to the repeat counter 51 as an increment command signal, to the retransmit buffer 50 as a read command signal and to the gate 44 via OR gate 52 as a gate-on pulse to store the frame and slot numbers of the retransmitted packet into the transmit memory 45. The repeat count value is thus incremented by one and applied to the retransmit buffer 50 where it is inserted to the repeat count field of the stored data. In response to that read command signal from counter 49, the copy of the previous user data with a new repeat count value from the retransmit buffer 50 are fed to the CRC encoder 32 and thence to multiplexer 33 where it is multiplexed with header data supplied from register 34 and transmitted to the central station, following the FEC encoding process provided by encoder 35. Therefore, a copy of the same previous packet with the exception of the repeat count value is sent to the central station on a time slot determined by the traffic data if the absence of ACK signal is detected by timer 55.

An overall operation of the system will be described with reference to FIG. 4 by assuming, for simplicity, that acknowledgment is received during next frame and each frame contains three time slots and that remote stations A, B and C are attempting to gain access to the satellite channel by sending conflicting packets A1, B1 on frame 1, A2 and C1 on frame 2, A3, C2 on frame 3, so that collisions occur between packets A1 and B1, between A2 and C1 and between A3 and C2. It is further assumed that the output of adder 16 at the central station is indicative of the total of all packets received during two successive frames and repeat count values given by the repeat count fields of such packets.

During frame 1, remote stations A and B respectively send their packets A1 and B1, each with a repeat count=0, on the third slot of the frame. Following the propagation delay, the transmitted packets A1 and B1 collide at the central station 1 and corrupted as indicated by a hatched rectangle 70. Since the number of packets received during successive two frames (i.e., the previous frame and frame 1) is zero, adder 16 at central station 1 produces a zero count as a total of packets received within these frames. Comparator 17 compares the zero count with the threshold values and produces traffic data indicating congestion level=0.

During frame 2, the central station transmits the zero-level indicating traffic data. No ACK signal is sent for packets A1 and B1. Remote stations A and C send their packets A2 and C1, each with a repeat count=0, on the second slot of the frame, resulting in a collision as indicated by a hatched rectangle 71. The number of packets received during frames 1 and 2 is still zero, and adder 16 produces a zero count again, and comparator 17 produces zero-level congestion traffic data.

During frame 3, the central station transmits the zero-level traffic data produced during frame 2. No ACK signal is sent for packets A2 and C1. Recognizing that packets A1 and B1 sent on frame 1 were not received by the central stations, remote stations A and B generate random numbers RN=0 and RN=1, respectively, at the beginning of frame 3 and send copies of the previous packets A1 and B1, each with a repeat count=1, on the first and second time slots of the frame, respectively (as specified by the random numbers 0 and 1). Subsequently, remote stations A and C send their packets A3 and C2 simultaneously on the third slot of the frame, which results in a collision as indicated at 72. Since the number of packets received during frames 2 and 3 is 2 and the total of repeat counts is 2, the adder 16 produces a count=4, and comparator 17 produces traffic data indicating that the congestion of the satellite channel has been increased to level 1.

During frame 4, the central station transmits the level-1 traffic data produced during frame 3. In response to the level-1 traffic data, remote stations A and C increase the range of their random number generators. No ACK signal is sent for packets A3 and C2, but ACK signals are sent for copies of packets A1 and B1. Recognizing that packets A2 and C1 sent on frame 2 were not received by the central station, remote stations A and C generate random numbers RN=1 and RN=0, respectively, at the beginning of frame 4 and send copies of the previous packets A2 and C1, each with a repeat count=1, on the second and first time slots of the frame, respectively. Since the number of packets received during frames 3 and 4 is 4 and the total of repeat counts is 4, the adder 16 produces a count=8, and comparator 17 produces traffic data indicating that the channel traffic has been increased to level 1.

During frame 5, the central station transmits the level-1 traffic data produced during frame 4. ACK signals are sent for copies of packets A2 and C1. Recognizing that packets A3 and C2 sent on frame 3 were not received by the central station, remote stations A and C generate random numbers RN=3 and RN=2, respectively, in the increased range at the beginning of frame 4 and send copies of the previous packets A3 and C2, each with a repeat count=1, on the first slot of frame 6 and on the third slot of frame 5, respectively. Since the number of packets received during frames 3 and 4 is 4 and the total of repeat counts is 3, the adder 16 produces a count=7, and comparator 17 produces traffic data indicating that the channel traffic is still at congestion level 1.

What is claimed is:

1. A satellite communications system including a central station and a plurality of remote stations for establishing a forward channel from each of said remote stations to said central station via a satellite and a backward channel from said central station to each of said remote stations via said satellite, said backward channel being divided into a plurality of frames and said forward channel being divided into frames corresponding to the frames of the backward channel, each of the frames of the forward channel being subdivided into slots, each of said remote stations comprising:
means for transmitting a packet containing user data randomly on one of said slots;
means for receiving traffic data and an acknowledgment signal from said central station if said packet is received by the central station or receiving no acknowledgment signal if said packet is not received by the central station;
a random number generator capable of generating random numbers in a range determined by said traffic data, said random number generator being responsive to receipt of no acknowledgment signal for generating one of said random numbers;
means responsive to receipt of no acknowledgment signal for incrementing a count value;
means for retransmitting the packet containing the count value on a slot of the forward channel identified by the generated random number; and
means responsive to receipt of said acknowledgment signal for resetting said count value to zero, said central station comprising:
means for receiving a packet from each remote station;
means for generating said acknowledgment signal in response to receipt of said packet;
means for deriving a sum of a total of the packets received during a predetermined interval and a total of the count values contained in said received packets;
means for deriving said traffic data from said sum; and
means for transmitting the acknowledgment signal and the traffic data on one of said frames of the backward channel together with host data.

2. A satellite communications system as claimed in claim 1, wherein said means for deriving said traffic data comprises means for comparing said sum total with threshold values respectively representing congestion levels of said forward channel and producing said traffic data representative of a congestion level of said forward channel.

3. A satellite communications system as claimed in claim 1, wherein said means for receiving said packet comprises means for detecting an error from the received packet and generating a signal indicating that the packet is validly received if substantially no error is detected therein, and said means for deriving a sum comprises means for counting said signal from said error detecting means to provide said total of the packets received during said predetermined interval.

4. In a satellite communications system including a central station and a plurality of remote stations for establishing a forward channel from each of said remote stations to said central station via a satellite and a backward channel from said central station to each of said remote stations via said satellite, said backward channel being divided into a plurality of frames and said forward channel being divided into frames corresponding to the frames of the backward channel, each of the frames of the forward channel being subdivided into slots, a method comprising the steps of:
  a) transmitting a packet containing user data randomly on one of said slots from one of the remote stations;
  b) receiving, at said remote station, traffic data and an acknowledgment signal from said central station if the packet is received by the central station or receiving no acknowledgment signal if the packet is not received by said central station;
  c) if no acknowledgment signal is received by the step (b), generating a random number in a range determined by the traffic data;
  d) incrementing a count value indicating a number of times the step (c) is repeated, and retransmitting the packet containing said count value on a slot of the forward channel determined by said random number;
  e) repeating the steps (b) to (d); and
  f) if said acknowledgment signal is received by the step (b), resetting said count value to zero;
  g) receiving, at said central station, packets from said remote stations and generating acknowledgment signals for the received packets;
  h) deriving a sum of a total of the packets received by the step (g) during a predetermined interval and a total of the count values contained in the received packets;
  i) deriving said traffic data from said sum; and
  j) transmitting the acknowledgment signals, the traffic data and host data on one of said frames of the backward channel.

5. A method as claimed in claim 4, wherein the step (i) comprises comparing said sum total with threshold values respectively representing congestion levels of said forward channel and producing said traffic data representative of a congestion level of said forward channel.

6. A method as claimed in claim 4, wherein the step (g) comprises detecting an error from the received packet and generating a signal indicating that the packet is validly received if substantially no error is detected therein and the step (h) comprises counting said signal during said predetermined interval to provide said total of the packets.

* * * * *